March 16, 1965 T. J. MATCOVICH ETAL 3,174,138

MEMORY ELEMENTS USING VARIABLE AXIS ANISOTROPIC MAGNETIC THIN FILM

Filed Sept. 23, 1960

INVENTOR.
THOMAS J. MATCOVICH
WILLIAM E. FLANNERY

BY Robert [signature]

ATTORNEY

United States Patent Office 3,174,138
Patented Mar. 16, 1965

3,174,138

MEMORY ELEMENTS USING VARIABLE AXIS ANISOTROPIC MAGNETIC THIN FILM

Thomas J. Matcovich, Abington, and William E. Flannery, Norristown, Pa., assignors to Sperry Rand Corporation, New York, N.Y., a corporation of Delaware Filed Sept. 23, 1960, Ser. No. 58,025
2 Claims. (Cl. 340—174)

This invention relates to nondestructive read-out memory elements.

Magnetic memory elements are extensively used in connection with computers and other data processing units. Essentially, these storage elements are small pieces of very thin anisotropic magnetic films which are often mounted on a substrate in large arrays. They are provided with means for producing two magnetic fields, for example, crossed wires, and a readout pickup inductance which may be a single wire or pairs of wires. These films have two directions, one which magnetizes easily, and the other which magnetizes difficultly. The two directions are normally at right angles. For simplicity in describing both the prior art and the present invention these two directions will be referred to as vertical and horizontal, it being understood, of course, that as far as the array is concerned the films need not be exactly so oriented so long as the directions of hard and easy magnetization are properly related to the field producing means for writing in and reading out.

Let us assume an easy horizontal magnetizing direction and a hard vertical. It is now possible to magnetize by a writing signal in either direction depending on whether the information is of the so-called 0 or 1 type, the encoding being in the usual binary code. On command, therefore, the readout will have a magnitude or polarity which will give the information. Both writing in and reading out are very fast, the device lasts indefinitely, and stores well. However, when on comand a signal is readout, it destroys the information leaving the film in its original condition. Where memory devices are required to be used only once, this is not an objection and the old method, using films having permanent directions of anisotropism, gives excellent results. As will appear below for this particular specialized use the present invention presents no advantages.

Many memory storage elements, however, are required to be consulted more than once. An example is a computer obtaining information by solving incomplete equations by trial and error and comparing the result each time with preprogrammed requirements stored in the memory cells. In the so-called permanent anisotropic films of the past, this has required actuating an additional circuit so that the information is written back into the memory storage element everytime a signal is obtained which automatically destroys the memory. This is an added complication which has rendered the memory elements of the past undesirable for applications where repeated access to the memory element is necessary.

In the past attempts have been made to produce a memory storage element with a nondestructive readout. The writing in process still turns the magnetic vector either 0° or 180°. Essentially in this case for readout a pair of crossed wires is used to apply a magnetic field or turning couple which turns the magnetic vector by a small amount, usually not over 10°. On command there will be a signal whose polarity depends on whether a 1 or a 0 was stored. The command signal does not erase and so repeated consultations of the storage elements are possible. After the machine no longer requires access to the particular memory element, the magnetic vector is turned back into the original position and is then ready to receive a fresh signal.

This nondestructive readout has represented a considerable advance for the purposes where such a cell is needed. However, it has introduced a number of serious disadvantages. In the first place if the magnetic vector is turned only a little, the difference in signal readout for 1 or 0 is small and may be swamped by noise. A more positive readout with a stronger field cannot be used because whenever a field is created which tends to turn the magnetic vector there is the risk that the anisotropic film will break up into small domains. This makes it necessary to have a very accurately controlled readout command signal. Even if the control is accurate there is a further disadvantage that any turning of the magnetic vector eventually causes a breakup of the film which is evidenced by a gradual decrease in sharpness and reliability of the signal. To put it another way, even if careful control is used the nondestructive readout memory cell may have an insufficient life. When great care is employed this shortening of life may not be fatal and the memory storage elements may last sufficiently long to be useful, in fact they are used in a number of practical machines. The fact, however, that they are gradually deteriorating and have a finite life is still a serious drawback.

The present invention provides a magnetic storage element with an indefinite nondestructive readout and indefinite life, high reliability and random access to the information. This latter is of considerable importance because if information is stored on a tape or in other form where access is sequential and not random the simpler storage elements known in the past may be used. The penalty of long acces stime, however, in many cases is prohibitive.

The present invention utilizes a new type of variable axis film. This film which contains an amount of an element such as carbon or nitrogen more than .5% and not substantially in excess of 4.5% is described and claimed in the copending application of Arnold Schmeckenbecher, Serial No. 40,008, filed June 30, 1960, now Patent No. 3,124,490. Films are easily produced by deposition from iron, nickel and other metal carbonyls on heated substrate, the deposition being effected usually in the presence of diluting gases which are inert or reducing, such as hydrogen. The temperature of decomposition ranges from 150° to 350° C. and the decomposition or plating time is maintained sufficiently long to introduce the desired content of interstitial element, in the case of carbonyl decomposition carbon.

Schmeckenbecher films have the remarkable property that when they are exposed to a strong magnetic field, much stronger than the field for commanding readout, the direction of the hard and easy axes of magnetization are gradually turned to a position 90° from the original position. This turning is effected at the normal environmental temperature which is of importance because it has been known before that in certain other anisotropic films the direction of axes can be changed by magnetic fields but only at very high temperatures which are completely beyond the realm of practical use in memory storage elements. The term "gradually" used above is purely relative. The actual time is not over about a tenth of a second and with strong fields may be a little less. However, when compared to readout responses that are measured in microseconds or fractions thereof, it is still quite gradual or slow. It will be pointed out below, however, that the relatively slow change of axis direction is not always a disadvantage of any real significance because the present invention is useful only where the memory storage elements must provide indefinite non-destructive readout and for such uses, the information written in is always at a relatively slow rate, for example, by typewriter and the like. Thus in setting up stored information, a fairly slow write in is really of no significance.

Readout time which is commanded by a magnetic pulse giving a field less than that capable of turning the magnetic axis is extremely rapid, as fast as is possible with any magnetic film storage element. In other words, readout times of a microsecond or less are easily achieved. Neither writing in nor readout in any way shortens the life of the magnetic storage element. Essentially, it is a system which is bistable, the axes are either in one direction or at right angles to it, and there is no danger of a gradual breakup of the film into small domains. When the readout of the storage element is finally no longer needed, which may be after many thousands of readouts, an erasing pulse of suitable duration restores the cell to its original orientation. This is, however, not needed until a new program is set up at which time the relatively slower turning of the axes does not present any problem.

The invention will be described in connection with the drawings in which.

Figure 1:
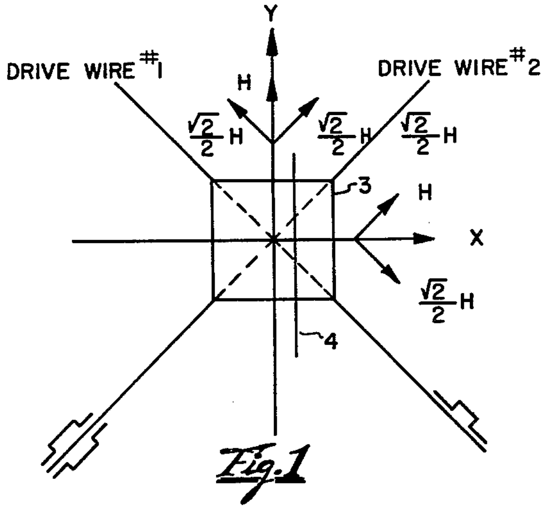
FIG. 1 is a plan view of a memory element with drive wires for writing in and a readout wire.
Figure 3:
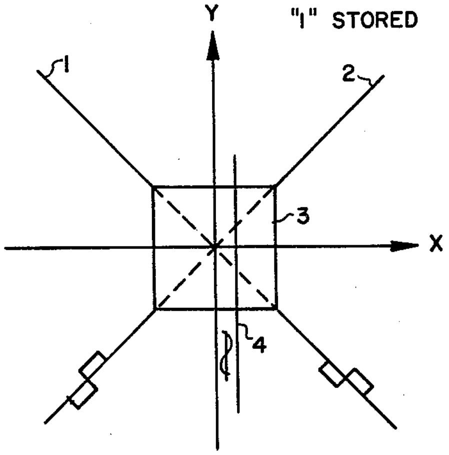
FIG. 3 is a plan view of the storage element on reading and 1.
Figure 4:
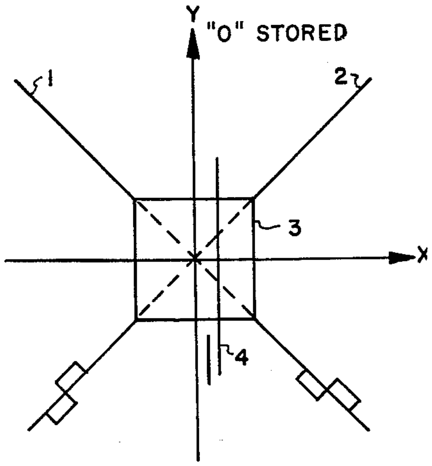
FIG. 4 is a similar plan view of a storage element reading out 0.

In FIGS. 1, 3 and 4 the magnetic film is shown at 3 with crossed drive wires 1 and 2 and a readout pickup wire 4. FIG. 1 also illustrates, diagrammatically and vectorially, the magnetic fields producible by the drive wires. The length of the magnetic axis vector is shown as H which signifies the minimum field strength capable of turning the axis of magnetization. As is normal in vectorial addition the magnetic fields produced by the two drive wires are each $$\sqrt{\frac{2}{2}}H$$

This information appears on the drawing in FIG. 1 only and is not repeated on FIGS. 3 and 4 for the sake of clearness. Pulses are fed into drive wires 1 and 2 in order to write in the information or memory. The pulses must be of sufficient amplitude so as to produce a magnetic field of at least $$\sqrt{\frac{2}{2}}H$$

Figure 2:
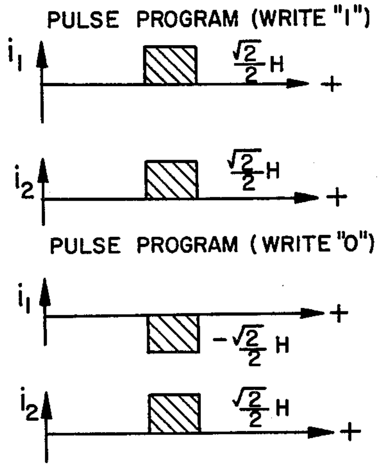
FIG. 2 illustrates pairs of coincident pulses in the wires for writing in 1 or 0.

The pulses must also be of fairly long duration, for example 0.1 second, in order to complete the rotation of the axis. If the pulses in the two wires are of the same polarity, which is indicated at the upper part of FIG. 2, the hard axis of the memory film is turned to the vertical. If, however, the pulses are of opposite polarity as shown in the lower part of FIG. 2 the hard axis remains horizontal. In the first case, 1 is written in and in the second 0.

So long as the pulses are sufficiently strong and for a sufficient time to exceed the minimum the axis will be completely turned and the exact pulse amplitude is a matter of more or less of complete indifference. Stronger pulses can be used and there is no necessity of a critical control in order to prevent breakup of the magnetic film into small areas as was the problem with nondestructive readout memory cells in the past. Of course, as a practical matter pulses of moderate amplitude will be used because as long as they are sufficiently intense to produce the requisite fields there is no advantage in wasting power unless a faster write in is desired. However, the amplitude is not at all critical and the field necessary with best films can be comparatively small, of the order of the magnitude of less than 10 oersteds.

When it is desired to command the film to give a readout signal, relatively short square waves are fed to the drive wires. This is shown in FIGS. 3 and 4. As has been pointed out below the readout speed is enormously high compared to the write in speed, and so these square waves can have a very short duration. This is also symbolically shown in FIGS. 3 and 4, but because the difference in pulse width from FIG. 1 may be a factor of hundreds of thousands this cannot be shown on a drawing and so the square waves commanding a readout have to be shown of much longer duration than is necessary in practice for purposes of illustration.

Turning to FIG. 3, which represents the state where the hard magnetization direction is vertical, the command signal encountering a high magnetic reluctance produces a signal in the pickup wire 4. This is shown on the drawing as a sine wave though, of course, the exact shape of the readout signal will depend on the nature of the command pulse train. An output signal, therefore, in the form of a wave of respectable amplitude signifies the state 1.

FIG. 4 illustrates the situation when the 0 state was written in, hence the hard axis of magnetization is horizontal, and the easy axis vertical. Now the command signal produces a field along the hard direction and no effect is produced. As a result, there will be no alternating signal in wire 4 and, therefore, absence of signal readout represents a 0 state of the memory.

The waves of output signal indicated beside the pickup wiring in FIGS. 3 and 4 are idealized. They would be true if the easy magnetization direction had no reluctance. In any practical film this is not true. In other words, the output signal for the 0 state, might show a very small wave, minute compared to that in the 1 state. This presents no problem because readout circuits can be provided with suitable threshold responses so any slight departure from zero signal in the situation shown in FIG. 4 will not cause any response in the circuits and, therefore, there will be only two possible types of output signals which cannot be confused. The present invention is concerned with a memory element and its write in and readout wires, it is not concerned with any design of electronic circuits for processing the readout signal. These are of conventional design and not significantly changed by using the present invention. They are, therefore, not shown.

It should be noticed that if each memory storage element, provided with its own drive wires and readout wires, is in a large array of memory cells, as is normal in many cases, any cell can receive write in information or command for a readout signal independently of what is happening in any other cells, in other words, the access is completely random which is an advantage.

The essential novelty of the present invention requires the use of the new variable axis films with associated means for producing the necessary magnetic fields for writing in information by the orientation of the axis in either of the two stable states and by suitable readout signal through wires. The drawings and the description are directed to one typical and simple form of such field producing means. The invention is in no sense limited thereto. Any means which will produce the fields of the required strength and the required polarity and direction may be employed, for example, coils may be used instead of wires. The invention is not concerned with the particular design of the field producing mechanisms in its broadest aspects but in a more specific aspect the simple crossed wires and signal pickup inductors present real design advantages and, therefore, are specifically covered.

We claim:

1. A magnetic memory element comprising (*a*) a very thin film of variable anisotropic magnetic axis capable of having its hard and easy magnetization directions switched to new directions approximately at right angles thereto by the application of a magnetic field at the normal environmental temperature, (*b*) write in and readout command means for producing magnetic fields in the film of sufficient magnitude, direction and duration to turn the magnetic axis to the new direction at right angles, (*c*) the readout command means being composed of pulses having a magnitude and duration less than that required to move the anisotropic magnetic axis, and (*d*) inductive pickup means oriented with respect to the two positions of the magnetic axis whereby on receipt of readout pulses an output signal is produced which differs depending on the orientation of the magnetic axis.

2. A magnetic memory storage element according to claim 1 in which the write in and readout command are a single pair of drive wires crossed at approximately 90° adjacent to said film and a readout inductance wire at 45° to said drive wires.

References Cited in the file of this patent

UNITED STATES PATENTS

| | | |
|---|---|---|
| 2,778,005 | Allen | Jan. 15, 1957 |
| 3,070,783 | Pohm | Dec. 25, 1962 |

FOREIGN PATENTS

| | | |
|---|---|---|
| 845,604 | Great Britain | Aug. 24, 1960 |